(12) United States Patent
Höglund

(10) Patent No.: US 10,869,337 B2
(45) Date of Patent: Dec. 15, 2020

(54) RANDOM ACCESS COVERAGE ENHANCEMENT LEVEL RAMP UP PROCEDURE

(71) Applicant: TELEFONAKTIEBOLAGET LM ERICSSON (PUBL), Stockholm (SE)

(72) Inventor: Andreas Höglund, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/551,672

(22) PCT Filed: Jan. 31, 2017

(86) PCT No.: PCT/IB2017/050508
§ 371 (c)(1),
(2) Date: Aug. 17, 2017

(87) PCT Pub. No.: WO2017/134556
PCT Pub. Date: Aug. 10, 2017

(65) Prior Publication Data
US 2018/0376508 A1    Dec. 27, 2018

Related U.S. Application Data

(60) Provisional application No. 62/291,971, filed on Feb. 5, 2016.

(51) Int. Cl.
| | | |
|---|---|---|
| *H04W 74/08* | (2009.01) | |
| *H04L 27/26* | (2006.01) | |
| *H04W 52/18* | (2009.01) | |
| *H04W 52/48* | (2009.01) | |

(52) U.S. Cl.
CPC ..... *H04W 74/0833* (2013.01); *H04L 27/2613* (2013.01); *H04W 52/18* (2013.01); *H04W 52/48* (2013.01)

(58) Field of Classification Search
CPC ........... H04W 74/0833; H04W 52/482; H04W 52/18; H04L 27/2613
See application file for complete search history.

(56) References Cited

U.S. PATENT DOCUMENTS

| | | | |
|---|---|---|---|
| 2009/0305693 A1 | 12/2009 | Shimomura et al. | |
| 2015/0003117 A1* | 1/2015 | Ferrazza | H02M 3/33546 363/21.02 |

(Continued)

FOREIGN PATENT DOCUMENTS

| | | | | |
|---|---|---|---|---|
| WO | WO2015/012654 A1 | 1/2015 | | |
| WO | WO2016171445 A1 * | 4/2015 | ............ | H04W 24/02 |

(Continued)

OTHER PUBLICATIONS

Ericsson: "Remaining issues on random access for Rel-13 low complexity and enhanced coverage UEs",3GPP Draft; R2-156774— Remaining Issues on Random Access for Rel-13 Low Complexity and Enhanced Coverage UEs, $3^{rd}$ Generation Partnership Project (3GPP), Mobile Competence Centre ; Nov. 2015.*

(Continued)

*Primary Examiner* — Yemane Mesfin
*Assistant Examiner* — Henry Baron
(74) *Attorney, Agent, or Firm* — Baker Botts, LLP

(57) ABSTRACT

In one embodiment, a method in a user equipment (UE) for random access (RA) coverage enhancement (CE) is disclosed. The method includes transmitting a random access preamble to a UE, wherein a power of the random access preamble is determined, in part, by a current CE level. The method further includes incrementing a value of a counter by one, wherein the value of the counter indicates a number of random access preambles previously transmitted by the UE. The method may then compare the value of the counter after incrementing its value, to a transmission limit, wherein the transmission limit indicates a maximum number of random access preamble transmission attempts for the current CE level. In response to the counter being equal to the transmission limit plus one, the method includes resetting the value of the counter.

18 Claims, 9 Drawing Sheets

(56) References Cited

U.S. PATENT DOCUMENTS

2016/0205661 A1* 7/2016 Ryu .................. H04W 36/30
455/458
2016/0337991 A1* 11/2016 Zhang ................... H04W 4/70

FOREIGN PATENT DOCUMENTS

WO   WO2015/116732 A1   8/2015
WO   WO 2016171445   * 10/2016   ............ H04W 24/02

OTHER PUBLICATIONS

Ericsson: Remaining issues on random access for Rel-13 low complexity and enhanced coverage UEs, 3GPP Draft; R-2156774—Remaining Issues on Random Access for Rel-13 Low Complexity and Enhanced Coverage UEs, $3^{rd}$ Generation Partnership Project (3GPP), Mobile Competence Centre; 650, Route Des Luci, vol. RAN WG2, No. Anaheim, USA;Nov. 16, 2015-Nov. 20, 2015 Nov. 16, 2015(Nov. 16, 2015), XP051040424.
Notice of Acceptance of Complete Specification issued by the Companies and Intellectual Property Commission of South Africa for Patent Application No. 2018/05717—dated Sep. 30, 2019.
Office Action issued by the Canadian Intellectual Property Office for Application No. 3,013,542—dated Jun. 14, 2019.
Notice of Preliminary Rejection issued fo Korean Patent Application No. 2018-702554—dated Oct. 24, 2019.
Office Action issued by the Canadian Intellectual Property Office for Application No. 3,013,542—dated May 15, 2020.
Examination Report issued by the Intellectual Property India for Application No. 20181702939—dated May 22, 2020.

* cited by examiner

RANDOM ACCESS COVERAGE ENHANCEMENT LEVEL RAMP UP PROCEDURE

TECHNICAL FIELD

The present disclosure relates generally to a radio network node, a user equipment (UE), and to methods therein. In particular, embodiments discussed herein relate to random access coverage enhancement-level ramp up procedure

BACKGROUND

Machine type communication (MTC) involves providing connectivity for devices that communicate without human interaction. MTC will exponentially increase the number of connections made in a communication network, even more so than the increase of human subscriptions and the number of fixed connections. This expansion of connected devices is sometimes referred to as 'the networked society.'

The requirements of MTC devices may differ from those of human oriented smart phone traffic. MTC devices need to have low cost, which is achieved by low UE complexity and reduced capabilities (e.g., one receiving antenna, a narrow device bandwidth smaller than the system bandwidth, etc.). The power consumption of MTC devices should also be low to prolong battery life such that interactive battery charging is not required, preferably throughout the life span of the device. To be able to reach devices in challenging locations, such as basements, it is desirable to enhance coverage in comparison to normal systems.

In 3GPP, Rel-13 MTC work is ongoing to support coverage enhancements (CE) of up to 15 dB. Coverage enhancement is achieved by time repetition in a TTI bundling manner, similar to that introduced for VoIP in Rel-8. In Rel-8, TTI bundling is limited to the uplink shared data channel and fixed to four repetitions. For Rel-13 MTC UEs requiring coverage enhancements, the number of repetitions can be configured per cell or per UE, and will also be applied to the downlink. Link simulations show that the number of required repetitions can be in the order of 100 to achieve the targeted 15 dB gain for some channels. For random access there are currently four different CE levels, i.e. four different physical random access channel (PRACH) configurations with different repetition levels. For dedicated transmissions in radio resource control (RRC) connected mode, it has been agreed that the repetition level will be up to the network. Furthermore, the UE should not report any change in its CE level since this would generate unnecessary signaling.

In Rel-12 a lower complexity UE category (Cat-0) was introduced to support lower manufacturing costs for MTC devices. In Rel-13 further complexity reductions are being introduced where the largest change is a reduced device bandwidth to 6 PRBs or 1.4 MHz. This means that some legacy channels like the physical downlink control channel (PDCCH), which spans over the entire system bandwidth, cannot be received. One assumption for these low complexity UEs is to replace PDCCH with an updated version of an enhanced physical downlink control channel (E-PDCCH) transmitted only within six physical resource blocks (PRBs), which may be referred to as a MTC-physical downlink control channel (M-PDCCH). The lower complexity of the devices means that a small number of repetitions may be needed for these devices in normal coverage (i.e., to counteract the losses from using only one receiving antenna (Rel-12), loss of frequency diversity (Rel-13)). Further, due to the extended transmission time from repetition, the working assumption is to have cross-subframe scheduling. Thus, a transmission is first scheduled by repetitions on E-PDCCH and then the repetitions of the actual data transmission are carried out after the final transmission of the E-PDCCH.

RAN1 introduced two types of CE modes: CE mode A supporting a small number of repetitions, and CE mode B supporting a large number of repetitions. Whether the UE is configured with CE mode A or B will determine whether it used for different configurations, such as random access, M-PDCCH monitoring, PDSCH transmissions, etc. That is, different search spaces and frequency hopping parameters apply. For random access the four CE levels are divided such CE level 0 (normal coverage) and CE level 1 use CE mode A configuration, whereas the higher CE levels 2 & 3 use CE mode B configuration.

In E-UTRAN the UE starts the first random access attempt at a low transmission power. If a Random Access Response (RAR) is not received from the network node, the UE will step up the transmission power for the next random access attempt, and so on. As an upper limit, and to conclude that the RA procedure has failed, the maximum number of random access attempts is configured by a parameter (e.g., preambleTransMax). In more detail, the UE uses a counter (e.g., PREAMBLE_TRANSMISSION_COUNTER), which is initially set to 1. If the UE does not receive a RAR within the RAR-window, the UE will increase this counter by 1. It then checks if PREAMBLE_TRANSMISSION_COUNTER=preambleTransMax+1, and if it is, it will stop the random access power ramp-up and conclude that random access has failed.

The existing RA-counter process is not well suited for CE and ramping-up to higher CE levels.

SUMMARY

To address the foregoing problems, disclosed is method in a user equipment (UE) for random access coverage enhancement (CE) level ramp up. The method comprises transmitting a random access preamble to a UE, wherein a power of the random access preamble is determined, in part, by a current CE level. The method further includes incrementing a value of a counter by one, wherein the value of the counter indicates a number of random access preambles previously transmitted by the UE. The method may then compare the value of the counter after incrementing its value, to a transmission limit, wherein the transmission limit indicates a maximum number of random access preamble transmission attempts for the current CE level. In response to the counter being equal to the transmission limit plus one, the method includes resetting the value of the counter. In certain embodiments, in response to the counter being equal to the transmission limit plus one, the method further includes ramping up to a higher CE level.

In certain embodiments, prior to ramping up to the higher CE level, the method further includes determining that the UE supports the higher CE level and/or determining that the higher CE level is supported by a cell, wherein the UE is transmitting the random access preamble from within a coverage area of the cell.

In certain embodiments, in response to the value of the counter being less than the transmission limit, the method further includes increasing the power of the random access preamble.

In certain embodiments, the transmission limit is set to a legacy value for CE level 0 when the UE does not support CE. In certain embodiments, the current CE level is CE level 0 and the transmission limit is set to a legacy value for CE level 0.

In certain embodiments, the transmission limit is a first transmission limit and, in response to ramping up to a higher CE level and resetting the value of the counter, the method further includes applying a second transmission limit for the higher CE level.

In certain embodiments the first transmission limit and the second transmission limit are the same value. In certain embodiments, the first transmission limit and the second transmission limit are different values.

Also disclosed is a UE. The UE comprises a transceiver and processing circuitry communicatively coupled to the transceiver. The transceiver may be configured to transmit a random access preamble, wherein a power of the random access preamble is determined, in part, by a current CE level of the UE. The processing circuitry may increment a value of a counter by one, wherein the value of the counter corresponds to the number of random access preambles previously transmitted by the UE. The processing circuitry may compare the value of the counter after incrementing its value, to a transmission limit, wherein the transmission limit indicates a maximum number of random access preamble transmission attempts for the current CE level. In response to the counter being equal to the transmission limit plus one, the processing circuitry may reset the value of the counter. In certain embodiments, in response to the counter being equal to the transmission limit plus one, the processing circuitry may ramp up to a higher CE level.

In certain embodiments prior to ramping up to the higher CE level, the processing circuitry of the UE is further configured to determine that the UE supports the higher CE level and/or determine that the higher CE level is supported by a cell, wherein the UE transmits the random access preamble from within a coverage area of the cell.

In certain embodiments, in response to the value of the counter being less than the transmission limit, the processing circuitry of the UE is further configured to increase the power of the random access preamble.

In certain embodiments, when the UE does not support CE, the transmission limit is set to a legacy value for CE level 0. In certain embodiments, the current CE level is CE level 0 and the transmission limit is set to a legacy value for CE level 0.

In certain embodiments, the transmission limit is a first transmission limit, in response to ramping up to a higher CE level and resetting the value of the counter, the processing circuitry of the UE is further configured to apply a second transmission limit for the higher CE level. In certain embodiments, the first transmission limit and the second transmission limit are the same value. In certain embodiments, the first transmission limit and the second transmission limit are different values.

Also disclosed is a method in a network node for RA CE. The method includes broadcasting a transmission limit to a UE within a serving cell of the network node. The transmission limit indicates a maximum number of random access preamble transmission attempts for one or more CE levels. The method further includes receiving a random access preamble transmission from the UE and transmitting a random access response message to the UE.

In certain embodiments, the method further includes communicating an indication of a highest CE level supported by the serving cell to the UE.

Also disclosed is a network node. The network node may include a transceiver and processing circuitry communicatively coupled to the transceiver. The transceiver may broadcast a transmission limit to a UE within a serving cell of the network node. The transmission limit indicates a maximum number of random access preamble transmission attempts for one or more CE levels. The transceiver may receive a random access preamble transmission from the UE and transmit a random access response message to the UE.

In certain embodiments, the transceiver of the network node may transmit an indication of a highest CE level supported by the serving cell to the UE.

Certain embodiments of the present disclosure may provide one or more technical advantages. For example, certain embodiments may advantageously determine that random access failure can appropriately be determined after a predetermined number of random access attempts at each CE level. Certain embodiments may advantageously avoid relying on the total number of random access attempts, which may not reach the highest CE level configured in the cell. Relatedly, certain embodiments may advantageously avoid performing too many random access attempts at the highest CE level, where maximum output power is agreed to always be used and subsequent attempts are not likely to succeed if the first one has failed. Accordingly, certain embodiments may advantageously reduce power consumption and prolong battery life of MTC devices.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
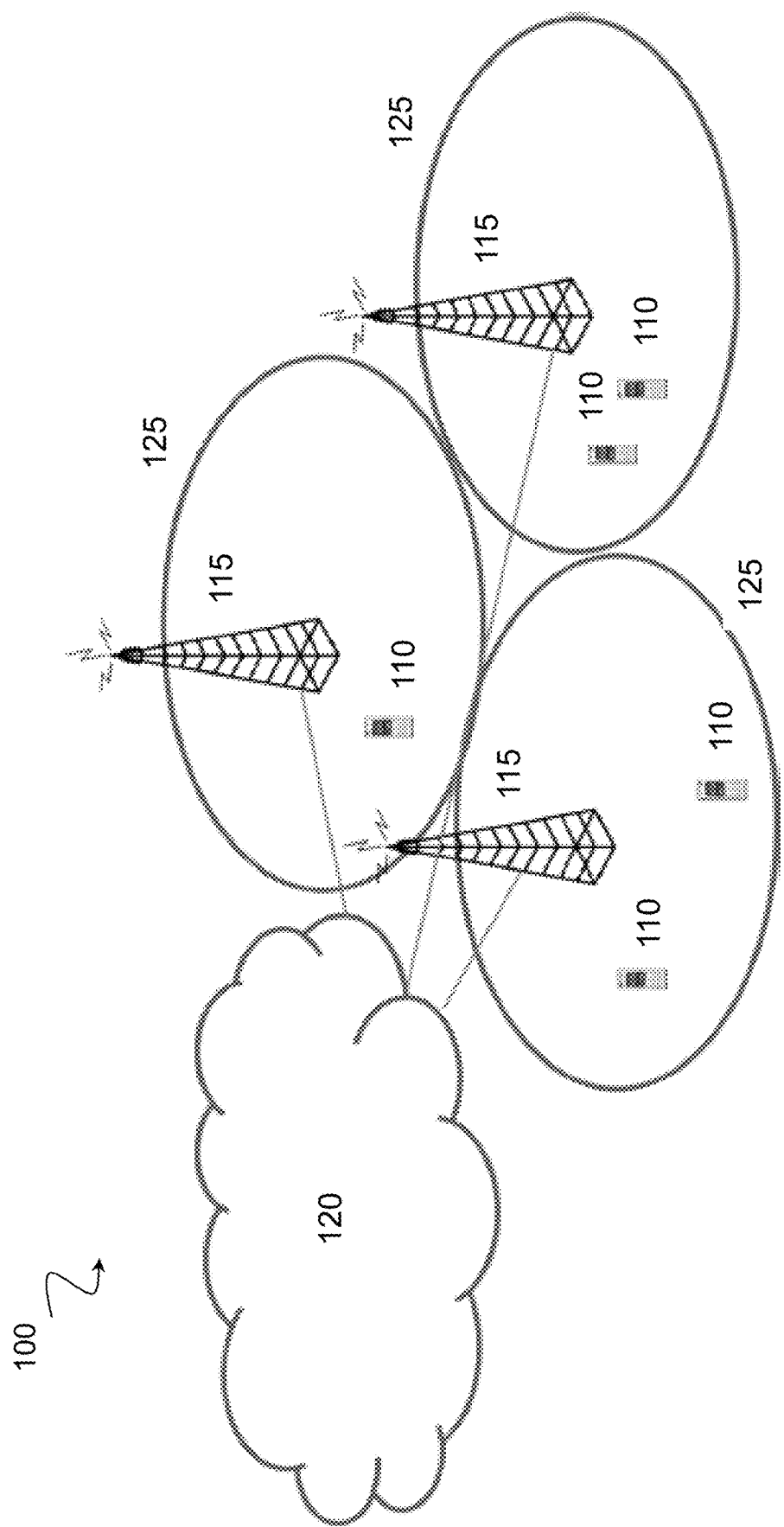
FIG. 1 is a schematic diagram of a wireless communication network, in accordance with certain embodiments.

As described above, the existing random access counter solution is not well suited for CE and ramping-up to higher CE levels. With CE, it is likely that fewer random access attempts will be allowed at higher CE levels. For example, legacy CE procedure relies on starting at a low initial transmission power and, over relatively many random access attempts, increasing the transmission power gradually. With CE level 1, the random access attempt is defined as a bundle of repetitions, with an increasing number of repetitions for higher CE levels (e.g., levels 2 and 3).

The higher the CE level, the lower the maximum number of random access attempts will be attempted by the UE. It is contra-productive to transmit a bundle of repetitions at a low transmission power since the same signal-to-interference-plus-noise ratio (SINR) may be achieved by transmitting fewer repetitions with a higher output power, hence consuming less time-resources. Furthermore, at a high output power, e.g. the maximum power used for the highest CE level, it is not meaningful to have very high number of random access attempts. If the first RA attempt did not succeed, it is unlikely that additional RA attempts with the same bundle size and the same output power will succeed either.

Accordingly, with a lower number of random access attempts for the CE levels, the legacy power-ramping mechanism is problematic. First, as described above, it is not meaningful to have a very low initial power when using repetitions. Second, with very few random access attempts it is likely that the output power will not be at the maximum output power at the final random access attempt, in which case the UE would change anyway to the next higher CE level, which is suboptimal since the current CE level may very well be sufficient.

To overcome these and other issues, embodiments of the present disclosure provide improved random access CE level ramp procedures. According to one embodiment, lower CE levels use a low initial transmission power and a higher number of random access attempts, while higher CE levels instead use a higher initial transmission power and a lower number of random access attempts. In some embodiments, the number of random access attempts may be CE level specific.

In some embodiments, the maximum number of random access attempts per CE level may be monitored (e.g., using a counter) and conditional actions may be taken when the maximum number of attempts for the CE level is reached. For example, the conditional action may be to reset the counter tracking the number of random access attempts to zero (or 1) and "ramp-up" to the next higher CE level (e.g., the UE may utilize a higher CE level). When the maximum number of random access attempts is reached in the highest CE level configured in the cell (or the highest CE level allowed by the UE), the UE may conclude that the overall random access procedure has failed.

Improved random access CE level ramp up procedures may provide a number of technical advantages not realized by current systems. Certain embodiments may advantageously determine that random access failure can appropriately be determined after a pre-determined number of random access attempts at each CE level. Certain embodiments may advantageously avoid relying on the total number of random access attempts, which may not reach the highest CE level configured in the cell. Relatedly, certain embodiments may advantageously avoid performing excessive random access attempts at the highest CE level, where maximum output power is agreed to always be used and subsequent attempts are not likely to succeed if the first one has failed. Accordingly, certain embodiments may advantageously reduce power consumption and prolong battery life of MTC devices. FIGS. 1-8 provide additional details related to random access CE level ramp procedures that may provide these and other advantages.

FIG. 1 is a schematic diagram of a wireless communication network 100, in accordance with certain embodiments. Network 100 includes one or more UE(s) 110 (which may be interchangeably referred to as wireless devices 110) and one or more network node(s) 115 (which may be interchangeably referred to as eNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, MTC UE or UE capable of machine to machine communication (M2M), a MTC device, low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3, etc.). In some cases, UE 110 may also operate in out-of-coverage scenarios.

In some embodiments, UEs 110 in communication network 100 will have different CE capabilities and, therefore, operate according to different CE modes. One or more UEs 110 may not be capable of enhanced coverage and may operate at CE level 0. One or more UE's 110 may be configured to use CE mode A, which may allow the UEs 110 to operate at CE levels 0 and 1. One or more UEs 110 may be configured to use CE mode A and B, which may allow the UEs 110 to operate at CE levels 0, 1, 2, and 3.

Also, in some embodiments generic terminology, "radio network node" (or simply "network node") is used. It can be any kind of network node, which may comprise a base station (BS), radio base station, Node B, multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel. Example embodiments of UE 110, network nodes 115, and other network nodes (such as radio network controller or core network node) are described in more detail below with respect to FIGS. 4-8.

Although FIG. 1 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

As described above, the present disclosure contemplates various embodiments for improved random access CE level ramp up procedures for wireless devices 110. For example, in one embodiment, UE 110 may transmit a random access preamble to network node 115 (e.g., a RACH preamble). UE 110 may then wait for a RAR from network node 115. If UE 110 does not receive a RAR from network node 115, UE 110 may determine that the random access response reception was unsuccessful. UE 110 may increase the transmit power of the random access preamble sent to network node 115 according to the random access CE level ramp up procedures described herein.

According to one embodiment, after transmitting the random access preamble, UE 110 may increase a counter that monitors the number of times UE 110 has transmitted a random access preamble for the current CE level (e.g., preamble transmission counter). UE 110 may then transmit another random access preamble to network node 115. Depending on the CE level, subsequent random access preambles may be transmitted at the same or higher transmit power.

In some embodiments, UE 110 may continue transmitting random access preambles and updating the preamble transmission counter until the preamble transmission counter reaches the highest number of random access attempts for the current CE level. For example, UE 110 may compare the preamble transmission counter to a set or predetermined limit (e.g., maximum transmission limit). If the preamble transmission counter is below the max transmission limit, then UE 110 may increase the random access transmission power and retransmit the random access preamble. However, in some embodiments, when the preamble transmission counter reaches the max transmission limit (or the max transmission limit plus one), UE 110 may determine whether to proceed at a higher CE level.

To determine whether UE 110 proceeds at a higher CE level, UE 110 may determine whether the current CE level is the highest configured level for cell 125. Additionally or alternatively, UE 110 may determine whether the current CE level is the highest configured CE level supported by UE 110. If UE 110 is already operating at the highest CE level in cell 125 and/or if the current CE level is the highest CE level supported by UE 110, then UE 110 may determine that the random access procedure has failed. However, if cell 125 supports a higher CE level than the current CE level and/or wireless device can operate at a higher CE level, then UE 110 may ramp up to the next high CE level.

Figure 2:
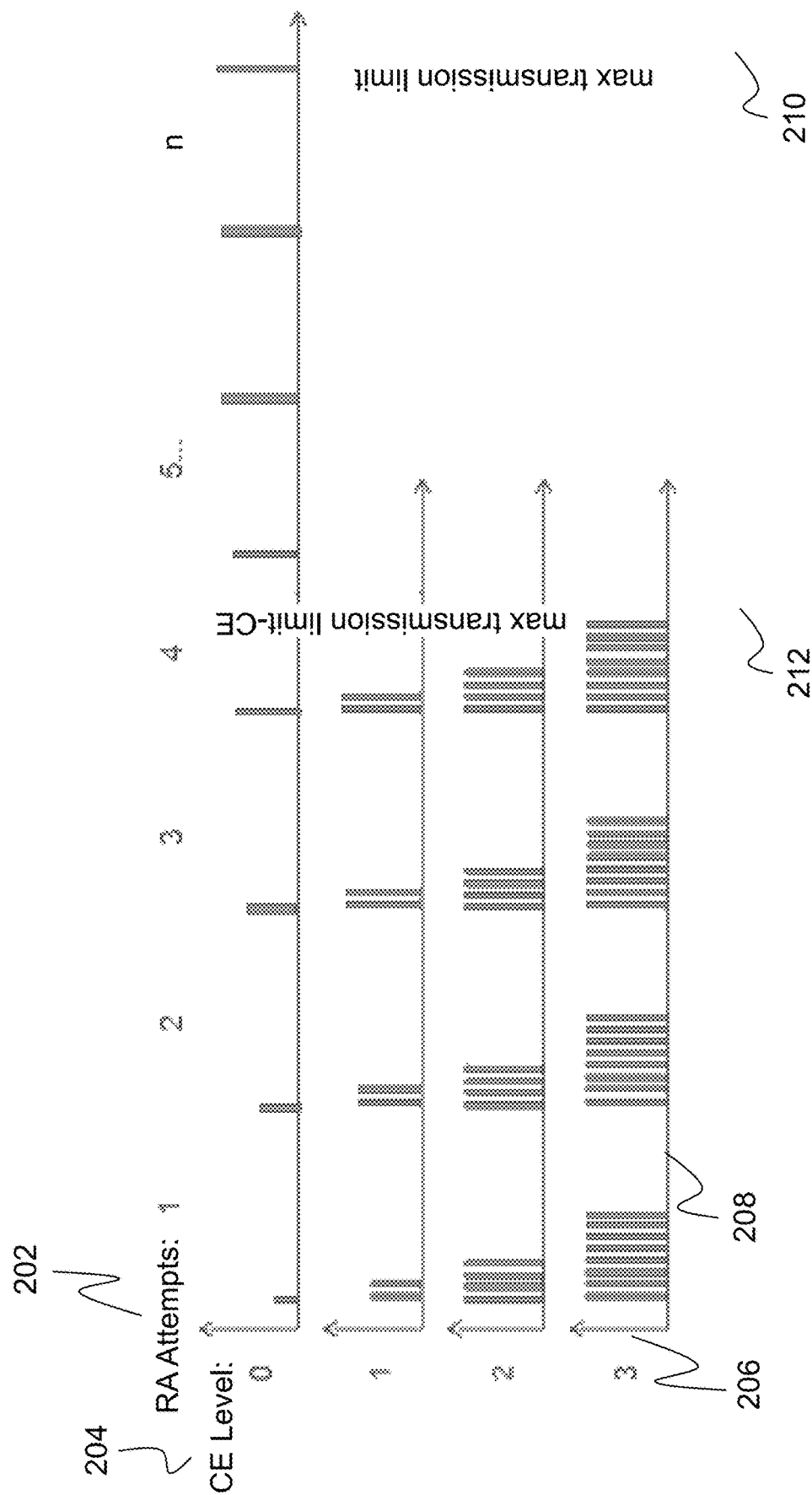
FIG. 2 is an example diagram illustrating the transmission power of various random access attempts and CE levels, in accordance with certain embodiments

For example, if UE 110 is operating at CE level 0, and preamble transmission counter reaches the max transmission limit, UE 110 may determine whether it can support operating at CE level 1. In some embodiments, UE 110 may additionally or alternatively determine whether cell 125 can support operating at CE level 1. For example, in some embodiments, network node 115 may broadcast an indication of the highest CE level supported by cell 125. In some embodiments, the indication may establish which modes (e.g., A and/or B) are supported by cell 125. If UE 110 and/or cell 125 can support operating at CE level 1, then UE 110 may ramp up from CE level 0 to CE level 1. FIGS. 2-3 further illustrate embodiments of the present disclosure that provide improved random access CE level ramp up procedures for wireless devices 110.

Upon ramping up to CE level 1, UE 110 may then transmit the random access preamble to network node 115 at the specified transmission power and repetitions (if any) for transmissions at CE level 1. In some embodiments, network node 115 may receive the random access preamble from UE 110 and, in response, transmit a random access response message to UE 110. UE 110 may receive the random access response and determine that the random access procedure was successful.

FIG. 2 is an example diagram 200 illustrating the transmission power of random access attempts 202 and CE Levels 204, in accordance with certain embodiments. In the illustrated embodiment, the top of diagram 200 shows the number of RA attempts 202, while the left side of diagram 200 shows a number of CE levels 204. Each illustrated CE level (e.g., 0, 1, 2, 3) has a corresponding chart illustrating the random access preamble transmission for a given random access attempt. The y-axis 206 of each CE level chart illustrates the transmission power of the random access preamble transmission for a given random access attempt. The x-axis 208 of each CE level chart illustrates the passage of time as UE 110 attempts additional random access attempts.

Diagram 200 also includes cutoffs indicating the maximum number of random access attempts that UE 110 should attempt for each CE level, according to certain embodiments. Diagram 200 includes max transmission limit 210, which represents a variable that indicates the maximum number of random access attempts for CE level 0. Similarly, diagram 200 includes max transmission limit-CE 212, which represents a variable that indicates the maximum number of random access attempts for CE levels 1, 2, and 3. While diagram 200 is illustrated with max transmission limit-CE 212 indicating the same value for CE levels 1, 2, and 3, max transmission limit-CE 212 may be set to any suitable level for any CE level. For example, max transmission limit-CE 212 may be set to one value for CE level 1, a second value for CE level 2, and a third value for CE level 3. As another example, max transmission limit-CE 212 may be the same value for two or more CE levels and a different value for other CE levels.

In some embodiments, to remain consistent with legacy behavior (e.g., Rel-13 and previous releases) and/or when CE is not supported by UE 110, the max transmission limit-CE 212 for CE level 0 may be set to a legacy value of the parameter max transmission limit 210 in cell 125. This may ensure that UE 110 makes the same number of random access attempts in normal coverage, independent of whether UE 110 supports the CE feature (i.e., CE levels 1, 2, and 3).

To illustrate diagram 200, UE 110 may transmit a random access preamble (e.g., when UE 110 is trying to access the communication network, during handover between network nodes 115, during a RRC connection re-establishment procedure, etc.) to network node 115. UE 110 may monitor the number of random access transmission attempts with a counter (e.g., preamble transmission counter). Diagram 200 thus illustrates a procedure that UE 110 may follow for improved random access CE level ramp up procedures.

Accordingly to diagram 200, if the preamble transmission counter reaches max transmission limit in CE level 0, UE 110 will ramp up to CE level 1 if UE 110 supports CE mode A or CE mode A & B. If UE 110 does not support CE, or if CE level 0 is the highest CE level configured in cell 125, UE 110 may conclude that random access has failed. In some embodiments, upon ramping up to the next CE level, UE 110 zero outs the preamble transmission counter.

If the preamble transmission counter of UE 110 reaches max transmission limit-CE 212 in CE level 1, UE 110 will ramp up to CE level 2 if UE 110 supports CE mode A & B. If UE 110 only supports CE mode A, or if CE level 1 is the highest configured in cell 125, UE 110 will conclude that random access has failed.

If the preamble transmission counter of UE 110 reaches max transmission limit-CE 212 in CE level 2, UE 110 will ramp up to CE level 3. If CE level 2 is the highest configured in cell 125, UE 110 will conclude that random access has failed.

Finally, if the preamble transmission counter reaches max transmission limit-CE 212 in CE level 3 the UE will conclude that random access has failed.

Thus, in certain embodiments, UE 110 may apply a maximum random access per CE level, max transmission limit-CE 212 and conditional actions when the maximum number of attempts for a CE level is reached. In some embodiments, for all but the highest CE level configured in cell 125, the conditional action may be to reset the preamble transmission counter to zero and ramp-up to the next higher CE level. In some embodiments, when the maximum number of random access attempts is reached in the highest CE level configured in cell 125, UE 110 will conclude that the overall random access procedure has failed.

Moreover as explained above, to remain consistent to legacy behavior and for wireless devices 110 that do not support CE, the max transmission limit-CE 212 for CE level 0 (normal coverage) may be set to the legacy parameter preambleTransMax in cell 125. This may ensure that UE 110 makes the same number of random access attempts in normal coverage, independent of whether UE 110 supports the CE feature (that is CE levels 1, 2, and 3).

Modifications, additions, or omissions may be made to the methods described herein without departing from the scope of the disclosure. Moreover the indications of the transmitted power level for each random access attempt is merely illustrative; any suitable power level configuration may be used within a CE level. For example, power ramping may be used for random access in CE mode A (CE levels 0 and 1) and maximum transmission power may be used for random access in CE mode B (CE levels 2 and 3). Similarly, the illustrated number of repetitions for each random access attempt for a given CE level is merely illustrative; any suitable number of repetitions for a CE level may be used. For instance, the number of repetitions for CE level 2 could be set to be marginally higher than that of CE level 1.

Figure 3A:
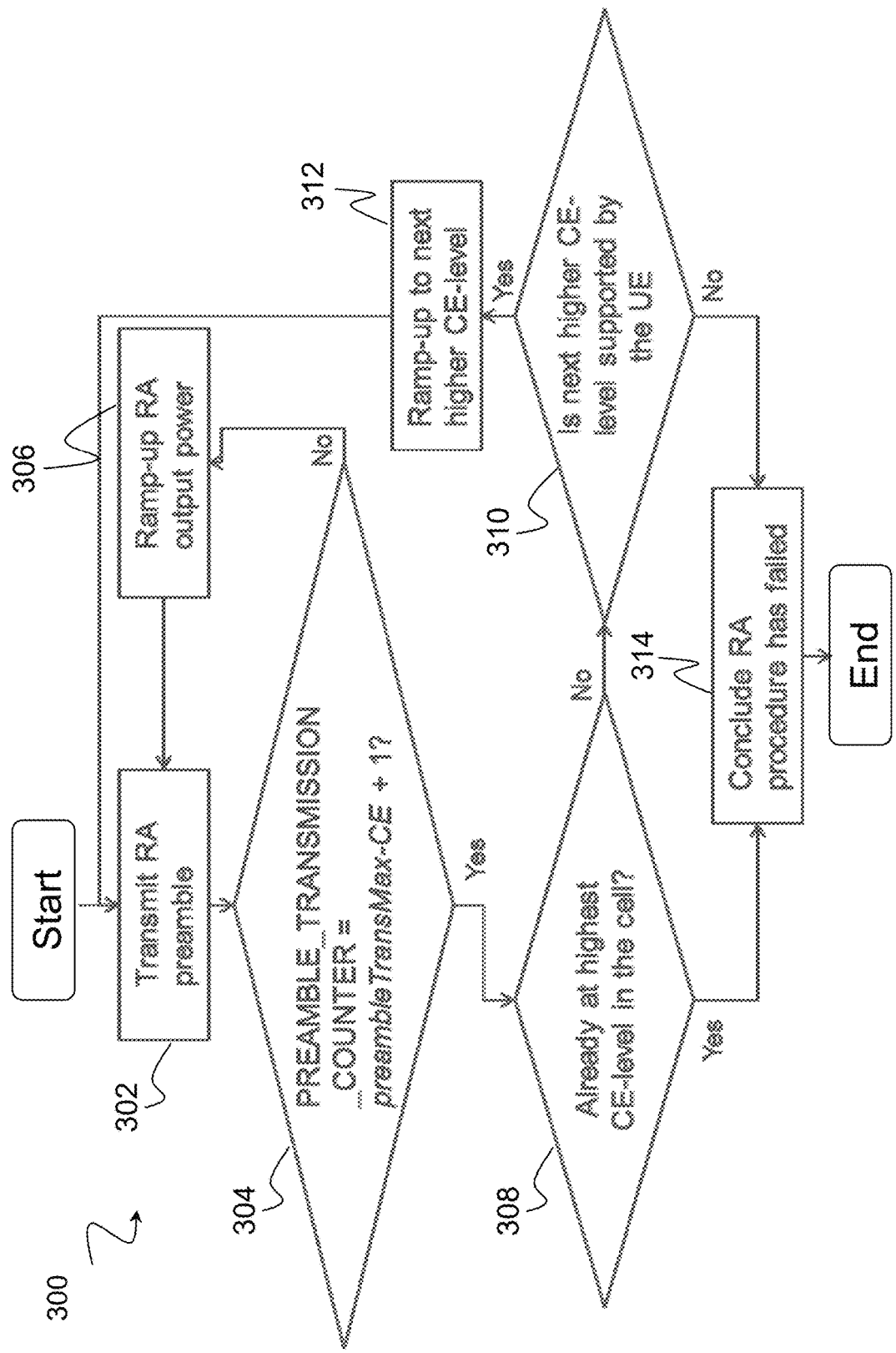
FIG. 3A is a flow chart of a method in a wireless device, in accordance with certain embodiments.

FIG. 3A is a flow chart of a method 300 in a UE 110, in accordance with certain embodiments. In some embodiments, method 300 may be performed by UE 110 when UE 110 is synchronizing with communication network 100. At step 302, UE 110 may transmit a random access preamble. UE 110 may also increment a counter, which tracks the number of transmitted random access preambles. In the illustrated embodiment, the counter is designated as Preamble_Transmission_Counter.

At step 304, UE 110 may compare the value of the counter to a transmit limit for the CE level. In the illustrated embodiment, the transmit limit for the CE level is designated as preambleTransMax-CE. If the value of the counter is equal to the transmit limit for the CE level plus one, then the process may proceed to step 308. If the value of the counter is less than the transmit limit for the CE level plus one, then the process may proceed to step 306.

For example, UE 110 may be transmitting random access preambles in CE level 1. In some embodiments, the transmission limit for CE level 1 may be set to four. After transmitting the random access preamble for a fifth time, UE 110 may update the counter and perform step 304. At step 304, wireless device may compare the counter, which is now at '5', to the transmission limit (i.e., 4) plus one. Since the counter equals the transmission limit plus one, the process may proceed to step 308.

As explained above, if UE 110 determines that the counter is less than the transmit limit for the CE level plus one, the process may proceed to step 306. At step 306, UE 110 may ramp-up the transmit power of the random access preamble and proceed back to step 302 to transmit the random access preamble.

As explained above, if at step 304 UE 110 determines that the counter is equal to the transmit limit for the CE level plus one, then the process may proceed to step 308. At step 308, UE 110 may determine whether the current CE level is the highest CE level in cell 125. If the current CE level is the highest CE level supported by cell 125, then the sequence may proceed to step 314. If the current CE level is not the highest CE level supported by cell 215, then the sequence may proceed to step 310.

At step 310, UE 110 may determine whether the current CE level is the highest CE level supported by UE 110. If the current CE level is the highest CE level supported by UE 110, then the sequence may proceed to step 314. If the current CE level is not the highest CE level supported by UE 110, then the sequence may proceed to step 312.

Prior to executing step 312, wireless device determined that cell 125 and UE 110 supported a higher CE level than the current CE level. At step 312, UE 110 may ramp-up to the next CE level. The sequence may then proceed back to step 302, wherein UE 110 may transmit a random access preamble according to the new CE level (e.g., using different repetitions and/or transmit power.)

In some embodiments, after executing step 312, UE 110 may reset the counter so that UE 110 begins counting transmissions at the new CE level from zero. In certain embodiments, UE 110 may also change the transmit limit based on the new, higher CE level. For example, in some embodiments, CE level 0 may have a different transmit limit than CE levels 1, 2, and 3. In some embodiments, CE levels 1, 2, and 3 may each have their own transmit limits.

At step 314, UE 110 has determined that either at step 308 that the current CE level is the highest CE level supported by cell 125, or at step 310 that the current CE level is the highest CE level supported by UE 110. Accordingly, at step 314 wireless device 310 determines that the random access procedure has failed and the method may end.

While the above embodiments provided an example illustration using a transmission limit set to four, any suitable value may be assigned to the transmission limit (e.g., broadcast by network node 115, by UE 110, through configuration, etc.). Moreover, any suitable comparison may be executed at step 304. For example, step 304 may compare the transmit counter to just the transmit limit for the CE level (instead of adding one to the transmit limit). Additionally, while method 300 indicates at step 306 that UE 110 may ramp-up the transmit power for the random access preamble, in certain embodiments a given CE level may transmit all random access attempts at the same transmit power level (e.g., a maximum power level for the CE level).

Furthermore, embodiments of the present disclosure may include additional steps, omit certain steps, and/or repeat certain steps. For example, in certain embodiments, UE 110 may only perform step 310 and not step 308 (or vice versa). In some embodiments, UE 110 may perform step 308 prior to performing step 310.

Figure 3B:
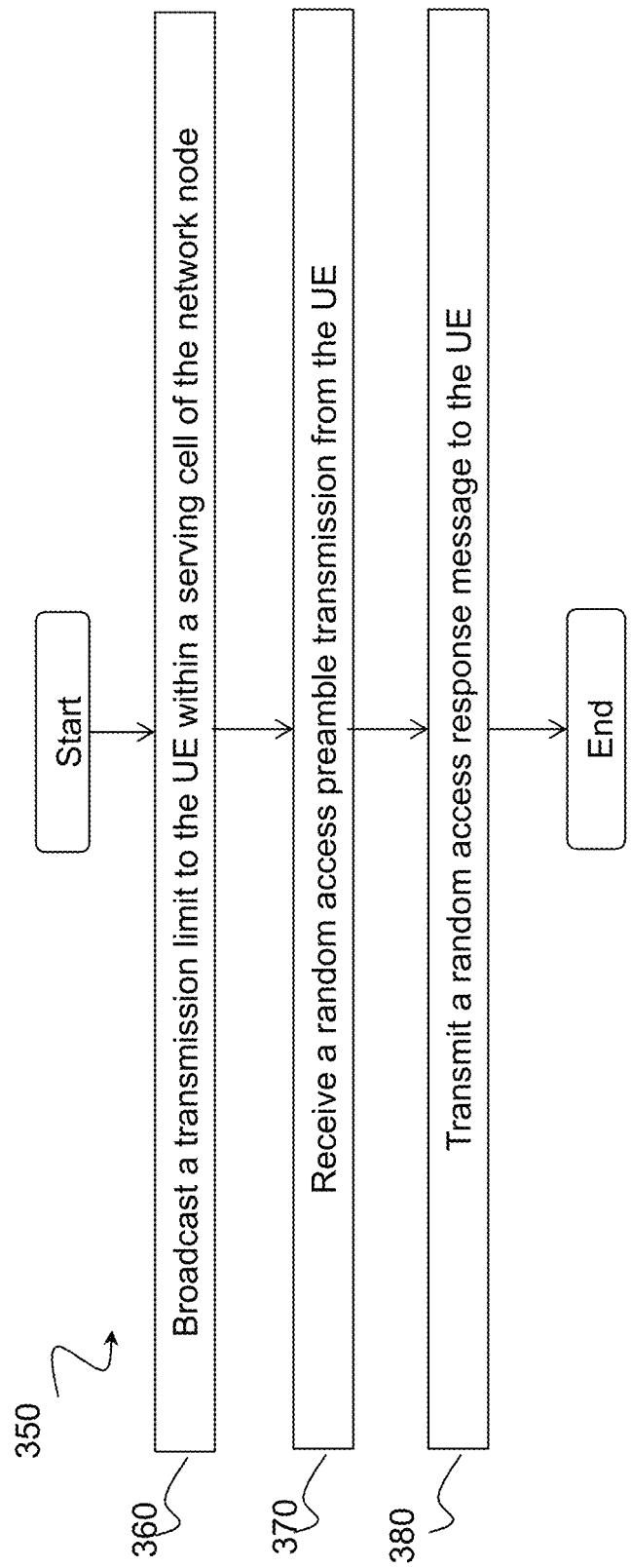
FIG. 3B is a flow chart of a method in a network node, in accordance with certain embodiments.

FIG. 3B is a flow chart of a method 350 in a network node 115, in accordance with certain embodiments. At step 360, network node 115 may broadcast a transmission limit to UE 110. UE 110 may be within serving cell 125 of network node 115. The transmission limit may indicate to UE 110 the maximum number of random access preamble transmission attempts that UE 110 may attempt for one or more CE levels. In some embodiments, network node 115 may communicate the transmission limit specifically to UE 110 instead of broadcasting the transmission limit. In certain embodiments, network node 115 may indicate to UE 110 an the highest CE level supported by the serving cell.

At step 370, network node 115 may receive a random access preamble transmission from UE 110. In some embodiments, upon receiving the random access preamble transmission from UE 110, network node 115 may determine various information from the preamble transmission, including the uplink transmission timing of UE 110 and the RA-RNTI.

At step 380, network node 115 may transmit a random access response message to UE 110. In some embodiments the random access response message may include information such as timing and uplink resource allocation information. After step 380, the process may end.

Figure 4:
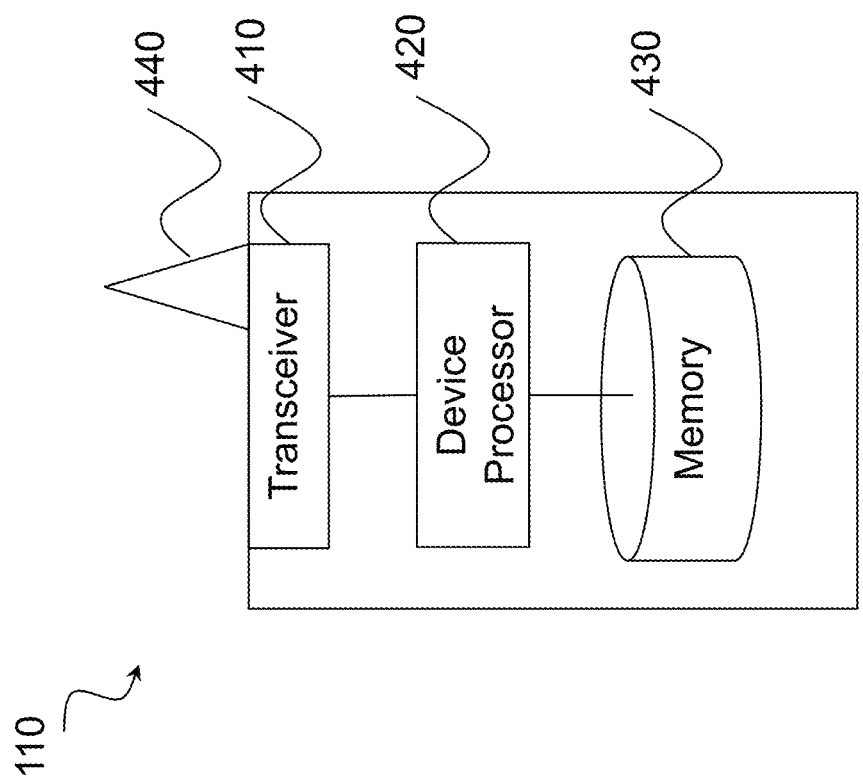
FIG. 4 is a schematic block diagram of an exemplary wireless device, in accordance with certain embodiments.

FIG. 4 is a schematic block diagram of an exemplary UE 110, in accordance with certain embodiments. UE 110 may refer to any type of wireless device communicating with network node(s) 115 and/or with another wireless device(s) 110 in a cellular or mobile communication system. Examples of UE 110 include a mobile phone, a smart phone, a PDA (Personal Digital Assistant), a portable computer (e.g., laptop, tablet), a sensor, a modem, a MTC device/machine-to-machine (M2M) device, laptop embedded equipment (LEE), laptop mounted equipment (LME), USB dongles, a D2D capable device, or another device that can provide wireless communication. UE 110 may also be referred to as UE, a station (STA), a device, or a terminal in some embodiments. UE 110 includes transceiver 410, processor 420, and memory 430. In some embodiments, transceiver 410 facilitates transmitting wireless signals to and receiving wireless signals from network node 115 (e.g., via antenna 440), processor 420 executes instructions to provide some or all of the functionality described above as being provided by UE 110, and memory 430 stores the instructions executed by processor 420.

Processor 420 may include any suitable combination of hardware and software implemented in one or more modules to execute instructions and manipulate data to perform some or all of the described functions of UE 110, such as the functions of UE 110 described above in relation to FIGS. 1-3. In some embodiments, processor 420 may include, for example, one or more computers, one or more central processing units (CPUs), one or more microprocessors, processing circuitry, one or more applications, one or more application specific integrated circuits (ASICs), one or more field programmable gate arrays (FPGAs) and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 420.

Other embodiments of UE 110 may include additional components beyond those shown in FIG. 4 that may be responsible for providing certain aspects of the wireless device's functionality, including any of the functionality described above and/or any additional functionality (including any functionality necessary to support the solution described above). As just one example, UE 110 may include input devices and circuits, output devices, and one or more synchronization units or circuits, which may be part of the processor 420. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 5:
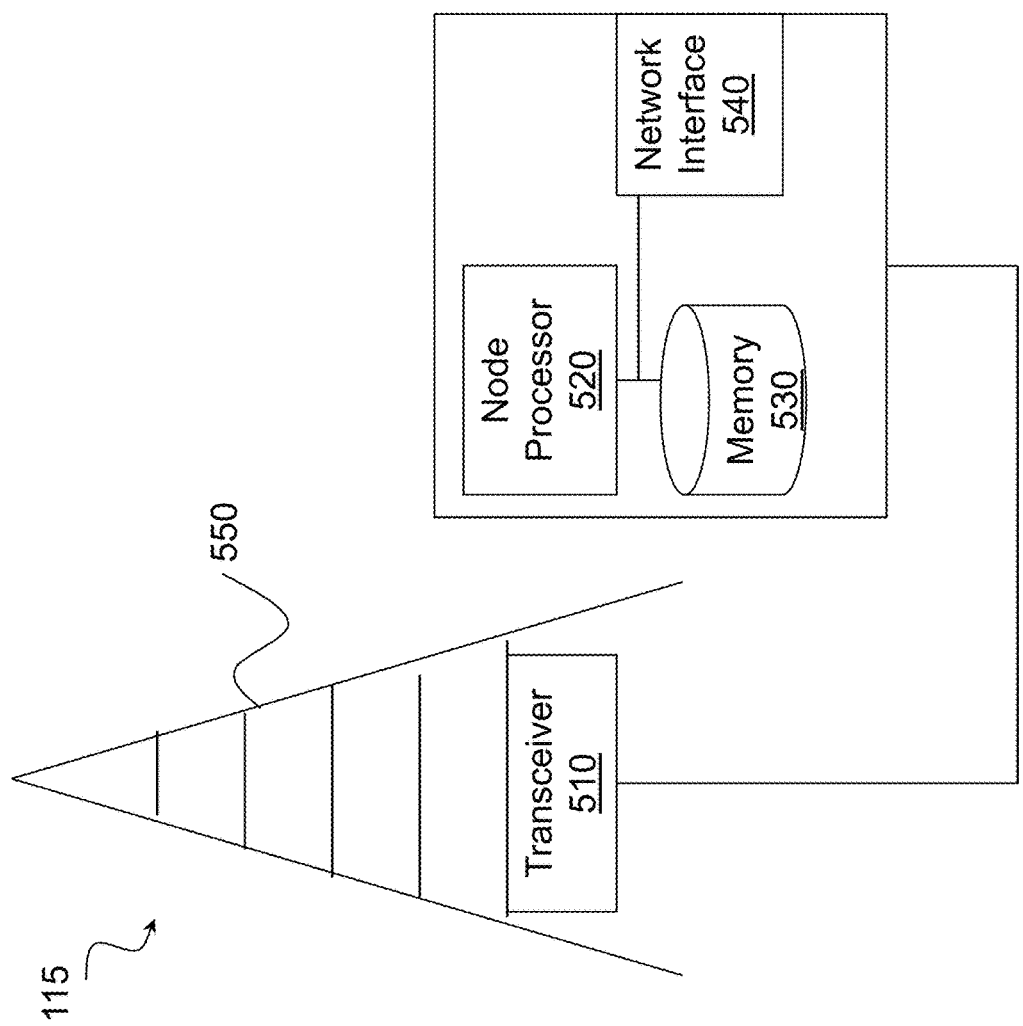
FIG. 5 is a schematic block diagram of an exemplary network node, in accordance with certain embodiments.

FIG. 5 is a schematic block diagram of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 510, processor 520, memory 530, and network interface 540. In some embodiments, transceiver 510 facilitates transmitting wireless signals to and receiving wireless signals from UE 110 (e.g., via antenna 550), processor 520 executes instructions to provide some or all of the functionality described above as being provided by a network node 115, memory 530 stores the instructions executed by processor 520, and network interface 540 communicates signals to backend network components, such as a gateway, switch, router, Internet, Public Switched Telephone Network (PSTN), core network nodes or radio network controllers 130, etc.

Processor 520 may include any suitable combination of hardware and software implemented in one or more modules to execute instructions and manipulate data to perform some or all of the described functions of network node 115, such as those described above in relation to FIGS. 1-3 above. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for network node 115, send output from network node 115, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of network node 115 may include additional components beyond those shown in FIG. 5 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 6:
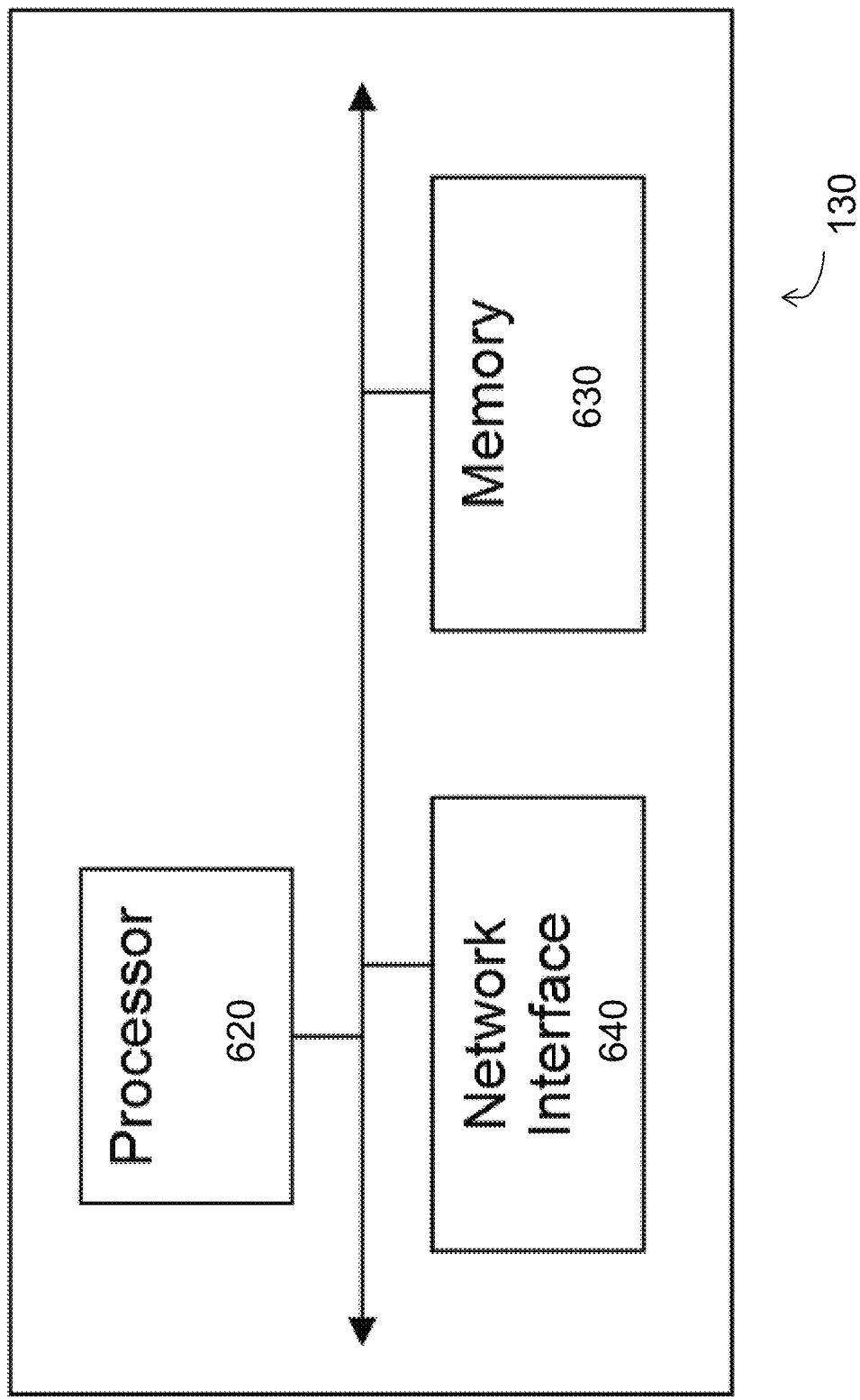
FIG. 6 is a schematic block diagram of an exemplary radio network controller or core network node, in accordance with certain embodiments.

FIG. 6 is a schematic block diagram of an exemplary radio network controller 130, in accordance with certain embodiments. Examples of network controller 130 can include a mobile switching center (MSC), a serving GPRS support node (SGSN), a mobility management entity (MME), a base station controller (BSC), and so on. The radio network controller 130 includes processor 620, memory 630, and network interface 640. In some embodiments, processor 620 executes instructions to provide some or all of the functionality described above as being provided by the network node, memory 630 stores the instructions executed by processor 620, and network interface 640 communicates signals to any suitable node, such as a gateway, switch, router, Internet, Public Switched Telephone Network (PSTN), network nodes 115, radio network controllers 120 or core network nodes 130, etc.

Processor 620 may include any suitable combination of hardware and software implemented in one or more modules to execute instructions and manipulate data to perform some or all of the described functions of the radio network controller 120 or core network node 130. In some embodiments, processor 620 may include, for example, one or more computers, one or more central processing units (CPUs), processing circuitry, one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processor 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 6 that may be responsible for providing certain aspects of the network node's functionality, including any of the functionality described above and/or any additional functionality (including any functionality necessary to support the solution described above).

Figure 7:
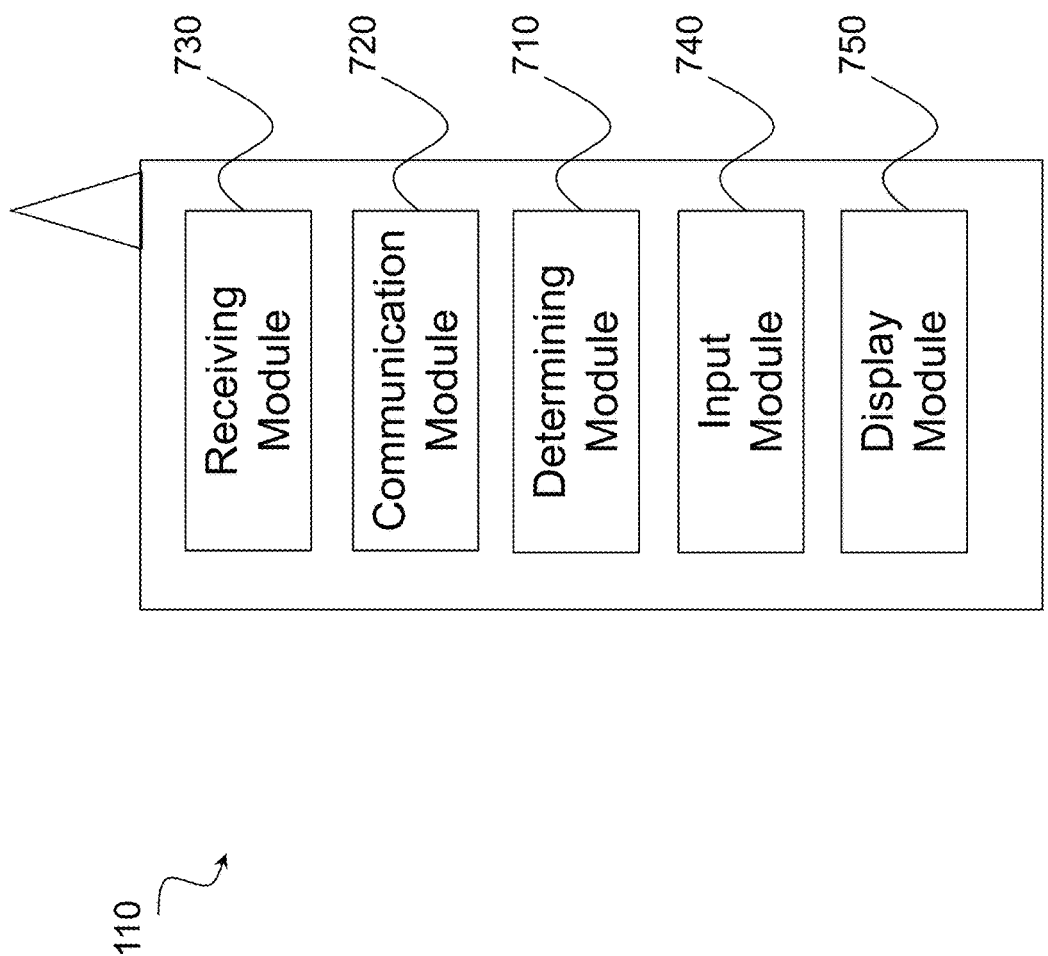
FIG. 7 is a schematic block diagram of an exemplary wireless device, in accordance with certain embodiments.

FIG. 7 is a schematic block diagram of an exemplary UE 110, in accordance with certain embodiments. UE 110 may include one or more modules. For example, UE 110 may include a determining module 710, a communication module 720, a receiving module 730, an input module 740, a display module 750, and any other suitable modules. In some embodiments, one or more of determining module 710, communication module 720, receiving module 730, input module 740, display module 750, or any other suitable module may be implemented using one or more processors, such as processor 420 described above in relation to FIG. 4. In certain embodiments, the functions of two or more of the various modules may be combined into a single module. UE 110 may perform the random access CE level ramp procedures described above with respect to FIGS. 1-3.

Determining module 710 may perform the processing functions of UE 110. In an example embodiment, determining module 710 may monitor and track the number of random access preamble transmission, for example by using a counter (preamble transmission counter). Determining module 710 may compare the preamble transmission counter to a set or predetermined limit (e.g., maximum transmission limit plus 1). If the preamble transmission counter is below the max transmission limit plus 1, determining module 710 may increase the random access transmission power for a subsequent transmission of the random access preamble.

However, in some embodiments, when the preamble transmission counter reaches the max transmission limit (or the max transmission limit plus one), determining module 710 may determine whether to proceed at a higher CE level. To determine whether UE 110 proceeds at a higher CE level, determining module 710 may determine whether the current CE level is the highest configured level for cell 125. Additionally or alternatively, determining module 710 may determine whether the current CE level is the highest configured CE level supported by UE 110. If UE 110 is already operating at the highest CE level in cell 125 and/or if the current CE level is the highest CE level supported by UE 110, then determining module 710 may determine that the random access procedure has failed. However, if cell 125 supports a higher CE level than the current CE level and/or wireless device can operate at a higher CE level, then determining module 710 may ramp up to the next higher CE level.

In some embodiments, upon ramping up to the next higher CE level, determining module may reset the preamble transmission counter. As before, determining module may then track the number of random access preamble transmissions made at the current CE level by incrementing the preamble transmission counter.

Determining module 710 may include or be included in one or more processors, such as processor 420 described above in relation to FIG. 4. Determining module 710 may include analog and/or digital circuitry configured to perform any of the functions of determining module 710 and/or processor 420 described above. The functions of determining module 710 described above may, in certain embodiments, be performed in one or more distinct modules.

Communication module 720 may perform the transmission functions of UE 110. For example, communication module 720 may transmit the random access preamble to network node 115. Communication module 720 may transmit messages to one or more of network nodes 115 of network 100. Communication module 720 may include a transmitter and/or a transceiver, such as transceiver 410 described above in relation to FIG. 4. Communication module 720 may include circuitry configured to wirelessly transmit messages and/or signals. In particular embodiments, communication module 720 may receive messages and/or signals for transmission from determining module 710. In certain embodiments, the functions of communication module 720 described above may be performed in one or more distinct modules.

Receiving module 730 may perform the receiving functions of UE 110. As one example, receiving module 730 may receive RAR responses from network node 115 when the random access preamble is successfully transmitted to network node 115. Receiving module 730 may include a receiver and/or a transceiver, such as transceiver 410 described above in relation to FIG. 4. Receiving module 730 may include circuitry configured to wirelessly receive messages and/or signals. In particular embodiments, receiving module 730 may communicate received messages and/or signals to determining module 710. The functions of receiving module 730 described above may, in certain embodiments, be performed in one or more distinct modules.

Input module 740 may receive user input intended for UE 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 710. The functions of input module 740 described above may, in certain embodiments, be performed in one or more distinct modules.

Display module 750 may present signals on a display of UE 110. Display module 1850 may include the display and/or any appropriate circuitry and hardware configured to present signals on the display. Display module 750 may receive signals to present on the display from determining module 710. The functions of display module 750 described above may, in certain embodiments, be performed in one or more distinct modules.

Determining module 710, communication module 720, receiving module 730, input module 740, and display module 750 may include any suitable configuration of hardware and/or software. UE 110 may include additional modules beyond those shown in FIG. 7 that may be responsible for providing any suitable functionality, including any of the functionality described above and/or any additional functionality (including any functionality necessary to support the various solutions described herein).

Figure 8:
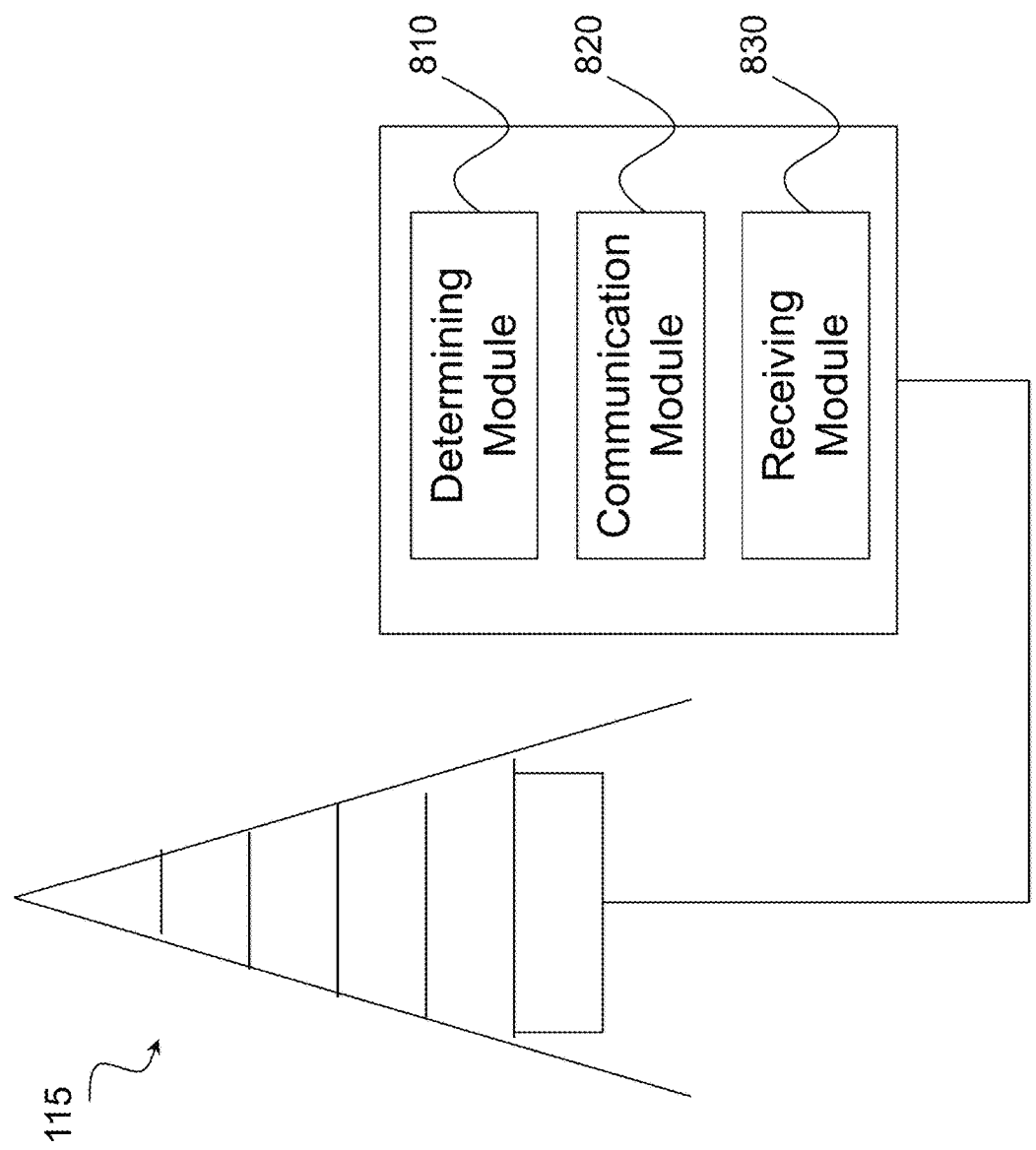
FIG. 8 is a schematic block diagram of an exemplary network node, in accordance with certain embodiments.

FIG. 8 is a schematic block diagram of an exemplary network node 115, in accordance with certain embodiments. Network node 115 may include one or more modules. For example, network node 115 may include determining module 810, communication module 820, receiving module 830, and any other suitable modules. In some embodiments, one or more of determining module 810, communication module 820, receiving module 830, or any other suitable module may be implemented using one or more processors, such as processor 520 described above in relation to FIG. 5. In certain embodiments, the functions of two or more of the various modules may be combined into a single module.

Determining module 810 may perform the processing functions of network node 115. Determining module 810 may include or be included in one or more processors, such as processor 520 described above in relation to FIG. 5. Determining module 810 may include analog and/or digital circuitry configured to perform any of the functions of determining module 810 and/or processor 520 described above. The functions of determining module 810 may, in certain embodiments, be performed in one or more distinct modules.

Communication module 820 may perform the transmission functions of network node 115. As one example, communication module 820 may communicate a RAR message to UE 110 in response to receiving a random access preamble. Communication module 820 may transmit messages to one or more of wireless devices 110. In some embodiments, communication module 820 may broadcast a preamble transmission limit to one or more UE 110 that are within cell 125 of network node 115. In certain embodiments, the preamble transmission limit may indicate a maximum number of random access preamble transmission attempts that UE 110 should attempt for one or more CE levels. In some embodiments communication module 820 may also communicate an indication of the highest CE level supported by cell 125. In certain embodiments, the indication may specify the CE modes (A and/or B) supported by cell 125. Communication module 820 may include a transmitter and/or a transceiver, such as transceiver 510 described above in relation to FIG. 5. Communication module 820 may include circuitry configured to wirelessly transmit messages and/or signals. In particular embodiments, communication module 820 may receive messages and/or signals for transmission from determining module 810 or any other module. The functions of communication module 820 may, in certain embodiments, be performed in one or more distinct modules.

Receiving module 830 may perform the receiving functions of network node 115. As one example, receiving module 830 may receive a random access preamble from UE 110. Receiving module 830 may receive any suitable information from a wireless device. Receiving module 830 may include a receiver and/or a transceiver, such as transceiver 510 described above in relation to FIG. 5. Receiving module 830 may include circuitry configured to wirelessly receive messages and/or signals. In particular embodiments, receiving module 830 may communicate received messages and/or signals to determining module 810 or any other suitable module. The functions of receiving module 830 may, in certain embodiments, be performed in one or more distinct modules.

Determining module 810, communication module 820, and receiving module 830 may include any suitable configuration of hardware and/or software. Network node 115 may include additional modules beyond those shown in FIG. 8 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. It should be understood that names for counters and variables such as preamble transmission counter, max transmission limit-CE, and max transmission limit are merely illustrative and not limiting. Moreover, the illustrative variable preamble transmission counter may be equivalent to the variable PREAMBLE_TRANSMISSION_COUNTER CE and the illustrative variable max transmission limit-CE may be equivalent to maxNumPreambleAttemptCE as these terms are used in the 3GPP TS 36.321 standard.

Any suitable parameter or counter name may be used. In some embodiments, additional counters may be used to define limits or counts at different CE levels. For example, CE level 1 may have the same or a different maximum transmission limit than CE levels 0, 2, and/or 3. Furthermore, UE 110 may use a different variable to monitor the random access preamble attempts for each CE level. For example, random access preamble attempts for CE level 2 may be tracked using a first counter and random access preamble attempts for CE level 3 may be tracked using a second counter. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

UE User equipment
LTE Long term evolution
LC Low complexity
CE Coverage enhancement
MTC Machine type communication
E-PDCCH Enhanced physical downlink control channel
PUSCH Physical uplink shared channel
PDSCH Physical downlink shared channel
PDCCH Physical downlink control channel
PRB Physical resource block
TTI Transmission time interval
M-PDCCH MTC physical downlink control channel
DCI Downlink control indicator
PUCCH Physical uplink control channel
eNB E-UTRAN Node B (base station)
DRX Discontinuous reception
PSM Power saving mode
HO Handover

The invention claimed is:

1. A method in a user equipment (UE) for random access coverage enhancement (CE), the method comprising:
   transmitting a random access preamble, wherein a power of the random access preamble is determined, in part, by a current CE level, the current CE level being associated with a first transmission power and a first transmission limit comprising a first threshold number of random access attempts;
   changing a value of a counter by one, wherein the value of the counter indicates a number of random access preambles previously transmitted by the UE;
   comparing the value of the counter, after changing its value, to the first transmission limit comprising the threshold number of random access preamble transmission attempts for the current CE level; and in response to the counter surpassing the transmission limit:
ramping up to the higher CE level, the higher CE level is associated with a second transmission power and a second transmission limit comprising a second threshold number of random access attempts, wherein the second transmission power associated with the higher CE level is higher than the first transmission power associated with the current CE level, and wherein the second threshold number of random access attempts is lower than the first threshold number of random access attempts; and
resetting the value of the counter.

2. The method of claim 1, wherein in response to the value of the counter being less than the transmission limit, the method further comprises increasing the power of the random access preamble.

3. The method of claim 1, wherein the transmission limit is set to a legacy value for CE level 0 when the UE does not support CE.

4. The method of claim 1, wherein the current CE level is CE level 0 and the transmission limit is set to a legacy value for CE level 0.

5. The method of claim 1, wherein the transmission limit is a first transmission limit, the method further comprising:
in response to ramping up to the higher CE level and resetting the value of the counter applying a second transmission limit for the higher CE level.

6. The method of claim 5, wherein the first transmission limit and the second transmission limit are the same value.

7. The method of claim 5, wherein the first transmission limit and the second transmission limit are different values.

8. A user equipment (UE), comprising:
a transceiver configured to transmit a random access preamble, wherein a power of the random access preamble is determined, in part, by a current coverage enhancement (CE) level level, the current CE level being associated with a first transmission power and a first transmission limit comprising a first threshold number of random access attempts;
processing circuitry communicatively coupled to the transceiver, the processing circuitry configured to:
change a value of a counter by one, wherein the value of the counter corresponds to the number of random access preambles previously transmitted by the UE level;
compare the value of the counter, after changing its value, to the first transmission limit comprising the first threshold number of random access preamble transmission attempts for the current CE level; and
in response to the counter surpassing the transmission limit:
ramp up to the higher CE level, the higher CE level is associated with a second transmission power and a second transmission limit comprising a second threshold number of random access attempts, wherein the second transmission power associated with the higher CE level is higher than the first transmission power associated with the current CE level, and wherein the second threshold old number of random access attempts is lower than the first threshold number of random access attempts; and
reset the value of the counter.

9. The UE of claim 8, wherein in response to the value of the counter being less than the transmission limit, the processing circuitry is further configured to increase the power of the random access preamble.

10. The UE of claim 8, wherein the transmission limit is set to a legacy value for CE level 0 when the UE does not support CE.

11. The UE of claim 8, wherein the current CE level is CE level 0, the transmission limit is set to a legacy value for CE level 0.

12. The UE of claim 8, wherein the transmission limit is a first transmission limit and, in response to ramping up to the higher CE level and resetting the value of the counter, the processing circuitry is further configured to apply a second transmission limit for the higher CE level.

13. The UE of claim 12, wherein the first transmission limit and the second transmission limit are the same value.

14. The UE of claim 12, wherein the first transmission limit and the second transmission limit are different values.

15. The method of claim 1, wherein changing the value of the counter comprises incrementing the counter, wherein the threshold number comprises a maximum number, and wherein surpassing the transmission limit comprises the counter being equal to the transmission limit plus one.

16. The UE of claim 8, wherein changing the value of the counter comprises incrementing the counter, wherein the threshold number comprises a maximum number, and wherein surpassing the transmission limit comprises the counter being equal to the transmission limit plus one.

17. The method of claim 1, wherein:
the UE ramps up to the higher CE level in response to:
determining that the UE supports the higher CE level; and
determining, based on an indication received from a network node of a highest CE level supported by the cell, that the higher CE level is supported by a cell, and
the method further comprises transmitting a second random access preamble based on the second transmission power associated with the higher CE level after ramping up to the higher CE level.

18. The UE of claim 8, wherein:
the processing circuitry is configured to ramp up to the higher CE level in response to:
determining that the UE supports the higher CE level; and
determining, based on an indication received from a network node of a highest CE level supported by the cell, that the higher CE level is supported by a cell, and
the processing circuitry is further configured to transmit a second random access preamble based on the second transmission power associated with the higher CE level after ramping up to the higher CE level.

* * * * *